United States Patent
Peng (10) Patent No.: US 10,743,703 B2
(45) Date of Patent: Aug. 18, 2020

(54) MOBILE COOKING AND INGREDIENT SUPPLY SYSTEM AND A SYSTEM TO PREPARE FOOD AND SUPPLY INGREDIENT

(71) Applicant: Shandong Sanqi Energy Co., Ltd., Shandong Province (CN)

(72) Inventor: Hsiu-Lin Peng, Kaohsiung (TW)

(73) Assignee: Shandong Sanqi Energy Co., Ltd., Shandong Province (CN)

( * ) Notice: Subject to any disclaimer, the term of this patent is extended or adjusted under 35 U.S.C. 154(b) by 305 days.

(21) Appl. No.: 15/842,892

(22) Filed: Dec. 15, 2017

(65) Prior Publication Data
US 2019/0090679 A1    Mar. 28, 2019

(30) Foreign Application Priority Data

Sep. 26, 2017   (CN) .......................... 2017 1 0879574

(51) Int. Cl.
*G06Q 50/12* (2012.01)
*A47J 27/12* (2006.01)
(Continued)

(52) U.S. Cl.
CPC .............. *A47J 27/12* (2013.01); *A47J 36/00* (2013.01); *G05B 19/042* (2013.01); *G05B 2219/2643* (2013.01); *G05B 2219/45111* (2013.01)

(58) Field of Classification Search
CPC .......... A47J 27/12; A47J 36/00; A47J 36/321; G05B 19/042; G05B 2219/45111;
(Continued)

(56) References Cited

U.S. PATENT DOCUMENTS

| 7,183,518 B2 | 2/2007 | Near et al. |
| 9,218,633 B2 | 12/2015 | Hulett et al. |

(Continued)

FOREIGN PATENT DOCUMENTS

| CN | 101902373 | 12/2010 |
| CN | 103999112 | 8/2014 |

(Continued)

*Primary Examiner* — Jun S Yoo
(74) *Attorney, Agent, or Firm* — JCIPRNET (57) ABSTRACT

A mobile cooking-and-ingredient-supply system includes a vehicle, a data-storage device, a cooking module, an ingredient-supply rack, first-ingredient-supply modules, an ingredient-replenishing station and a computing device. The data-storage device stores a food-preparation plan associated with a food preparation location, a preparation time, and an ingredient for preparing a food product. The cooking module is configured to prepare the food product based on the food-preparation plan. The first-ingredient-supply modules are carried by the ingredient-supply rack. The ingredient-replenishing station carries second-ingredient-supply modules to meet with the vehicle and replenish one of the first-ingredient-supply modules. The computing device is configured with computer-executable instructions based on the food-preparation plan, automatically causes the ingredient-replenishing station to prepare one of the second ingredient-supply modules based on the food-preparation plan, and automatically selects meeting time and meeting location based on the food-preparation plan, for the vehicle to meet with the ingredient-replenishing station.

19 Claims, 7 Drawing Sheets

(51) Int. Cl.
*A47J 36/00* (2006.01)
*G05B 19/042* (2006.01)

(58) Field of Classification Search
CPC ............ G05B 2219/2643; B60P 3/025; G06Q 10/083; G06Q 50/12; G06Q 10/087; G06Q 10/109; G06Q 10/08355; G06Q 10/0832; G06Q 10/0631; G07F 17/0064
See application file for complete search history.

(56) References Cited

U.S. PATENT DOCUMENTS

| | | |
|---|---|---|
| 9,292,889 B2 | 3/2016 | Garden |
| 9,336,545 B2 | 5/2016 | Shimmerlik et al. |
| 2014/0370167 A1* | 12/2014 | Garden .................. G08G 1/205 426/233 |
| 2015/0019354 A1 | 1/2015 | Chan et al. |
| 2016/0067866 A1* | 3/2016 | Sekar .................. B25J 11/0045 99/348 |
| 2019/0056751 A1* | 2/2019 | Ferguson ................ G06Q 10/08 |
| 2019/0270398 A1* | 9/2019 | Goldberg ......... G06Q 10/08355 |

FOREIGN PATENT DOCUMENTS

| | | |
|---|---|---|
| CN | 105785770 | 7/2016 |
| CN | 106081479 | 11/2016 |
| WO | 2015171630 | 11/2015 |
| WO | 2016169654 | 10/2016 |

\* cited by examiner

MOBILE COOKING AND INGREDIENT SUPPLY SYSTEM AND A SYSTEM TO PREPARE FOOD AND SUPPLY INGREDIENT

CROSS-REFERENCE TO RELATED APPLICATION

This application claims the priority benefit of China application serial no. 201710879574.4, filed on Sep. 26, 2017. The entirety of the above-mentioned patent application is hereby incorporated by reference herein and made a part of this specification.

BACKGROUND

Technical Field

The present disclosure generally relates to a mobile system. More particularly, the present disclosure relates to a mobile cooking and ingredient supply system, as well as a system to plan and coordinate the ingredient supply process for food preparation at a variety of locations.

Description of Related Art

Meal preparation for homeowners, small businesses, and other organizations involves planning and management, and normally results in expenditures of significant amounts of time and resources. For example, homeowners and/or operators of schools, nursing homes, factories, etc., typically make food purchases, as well as store food and cook food onsite to provide meals to the various participants.

When hot and prepared food was desired by those who prefer not to cook, traditionally consumers would travel to a restaurant or other food premises where such food would be prepared and consumed on site. Other consumers would travel to the restaurant or other food premises to purchase hot prepared food and then bring the food to an off-premises location, such as a home or picnic location for consumption. Yet other consumers may order food items from a restaurant, via phone or internet, and ask the restaurant to deliver the ordered food items to a home, office, or other locations for consumption. Over the time, the available delivery services for prepared or semi-prepared food items, offered either by restaurants or third-parties, have increased rapidly in marketplace.

In addition, mobile food services, such as food trucks or mobile food stands, are good alternatives to restaurant dinning or food delivery services. Based on the need described above, the proposed embodiments discloses a novel mobile cooking and ingredient supply system configured to support the mobile food services.

SUMMARY

One of the embodiments of the disclosure provides a mobile cooking and ingredient supply system including a vehicle with a cargo space, a data storage device, at least one cooking module, an ingredient supply rack, a plurality of first ingredient supply modules, an ingredient replenishing station and at least one computing device. The data storage device stores a food preparation plan, and the food preparation plan is associated at least in part with information of at least one food preparation location, at least one preparation time, and at least one ingredient for preparing a food product. The cooking module is configured to prepare the food product based at least in part on the food preparation plan. The ingredient supply rack is securely disposed in the cargo space. The first ingredient supply modules are carried by the ingredient supply rack and engaged with the ingredient supply rack. The ingredient replenishing station carries a plurality of second ingredient supply modules and is configured to meet with the vehicle and to replenish the first ingredient supply modules in the vehicle. The computing device is configured with specific computer-executable instructions based at least in part on the food preparation plan, automatically causes the ingredient replenishing station to prepare the second ingredient supply modules based at least in part on the food preparation plan, and automatically selects meeting time and meeting location based at least in part on the food preparation plan, for the vehicle to meet with the ingredient replenishing station to replenish the first ingredient supply modules in the vehicle.

According to an embodiment of the present disclosure, the replenishing station is placed in a predetermined location.

According to an embodiment of the present disclosure, the replenishing station is a mobile station and placed in a variable location.

According to an embodiment of the present disclosure, the method of replenishing the first ingredient supply modules in the vehicle comprises exchanging at least one of the first ingredient supply modules for at least one of the second ingredient supply modules from the ingredient replenishing station.

According to an embodiment of the present disclosure, a physical dimension of the first ingredient supply module to be exchanged is the same as a physical dimension of the second ingredient supply module to be exchanged.

According to an embodiment of the present disclosure, the computing device automatically selects the time for the vehicle to meet with the ingredient replenishing station based on the transit time to the food preparation location and the preparation time spent in the food preparation location.

According to an embodiment of the present disclosure, the computing device automatically selects the location for the vehicle to meet with the ingredient replenishing station based on the location of the ingredient replenishing station and the distance between the location of the ingredient replenishing station and the food preparation location.

According to an embodiment of the present disclosure, the computing device is further configured to identify at least one ingredient in the first ingredient supply modules and to obtain ingredient data comprising an ingredient description or available quantity of the ingredient from at least one ingredient data source for updating the food preparation plan dynamically with the ingredient data.

According to an embodiment of the present disclosure, the cooking module comprises at least one bacterium detecting device to detect existence of at least one type of bacteria when preparing the food product.

According to an embodiment of the present disclosure, the computing device is further configured to obtain a detecting result in real time from the bacterium detecting device and to dynamically update the food preparation plan with the detecting result from the bacterium detecting device.

According to an embodiment of the present disclosure, the cooking module comprises at least one ingredient preparation device configured to mechanically obtain measurable portions of a plurality of ingredients from the first ingredient supply modules and to prepare the ingredients comprising mixing the ingredients in at least one controllable manner or to making the ingredients into at least one controllable shape.

According to an embodiment of the present disclosure, the ingredient preparation device is in communication with the computing device and is configured to receive a request and automatically prepare the ingredients for the cooking module based at least in part on the request.

According to an embodiment of the present disclosure, the computing device is in remote communication with at least one communication device to dynamically share or update at least in part of the food preparation based at least in part on the food preparation location, the preparation time and the food product to be prepared.

One of the embodiments of the disclosure provides a system to prepare food and supply ingredients, and the system includes a non-transitory computer-readable medium, a computing device, a first communications port and a second communications port. The non-transitory computer-readable medium stores a plurality of computer-executable instructions. The computing device is communicatively coupled to the non-transitory computer-readable medium to execute the computer-executable instructions to: for one of a plurality of vehicles and one of a plurality of ingredient replenishing stations, determine time and location based at least in part on a dynamically updated food preparation plan, for the one of the vehicles to meet with the one of the ingredient replenishing stations to replenish one of the plurality of first ingredient supply modules in the one of the vehicles by exchanging the one of the first ingredient supply modules for one of a plurality of second ingredient supply modules from the one of the ingredient replenishing stations; for one of the second ingredient supply modules carried by the one of the ingredient replenishing stations, determine a type and a quantity of one of a plurality of ingredients to be prepared for the one of the second ingredient supply modules based at least in part on the dynamically updated food preparation plan for one of the vehicles to visit one of a plurality of food preparation locations to prepare the food products; for the one of the vehicles, determine an estimated travel time and an estimated stop time for the one of the vehicles to visit the one of the food preparation locations along a route which starts and ends with meeting at least one of the ingredient replenishing stations; and for the one of the vehicles, determine one of a plurality of ingredients carried by the one of the first ingredient supply modules to be prepared and at least one food product to be prepared based at least in part on the dynamically updated food preparation plan when traveling along the route. The first communications port is communicatively coupled to the non-transitory computer-readable medium to provide information indicative of a location of the one of the ingredient replenishing stations and the quantity of the one of the ingredients in the one of the second ingredient supply modules carried by the one of the ingredient replenishing stations. The second communications port is communicatively coupled to the non-transitory computer-readable medium to provide information indicative of a location of the one of the vehicles and a quantity of the one ingredient of the one of the first ingredient supply modules carried by each of the vehicles.

According to an embodiment of the present disclosure, the computing device dynamically determine the type and the quantity of the one of the ingredients to be prepared for the one of the second ingredient supply modules, and the type and the quantity of the one of the ingredients are determined based at least in part on the dynamically updated food preparation plan for the one of the vehicles to visit the one of the food preparation locations.

According to an embodiment of the present disclosure, the computing device dynamically determines the time and the location for the one of the vehicles to meet with the one of the replenishing stations to replenish the at least one first ingredient supply module based at least in part on updated usage information of the at least one ingredient and based at least in part on the dynamically updated food preparation plan.

According to an embodiment of the present disclosure, the computing device dynamically determines the estimated travel time for each of the vehicles to each of the food preparation locations to be visited based at least in part on updated traffic information of the route.

According to an embodiment of the present disclosure, for one of the vehicles, the computing device dynamically determines a variance in the route of each of the vehicles, and dynamically determines the change of one of the food preparation locations to be visited along the route based at least in part on the variance of the route.

According to an embodiment of the present disclosure, for one of the vehicles, the computing device dynamically determines whether one of the vehicles should be replaced or not based at least in part on the variance of the route.

According to an embodiment of the present disclosure, for one of the vehicles, the computing device dynamically determines a cancellation from one of the food preparation locations to be visited along the route based at least in part on existence of at least one type of bacteria detected by a bacterium detecting device.

BRIEF DESCRIPTION OF THE DRAWINGS

The accompanying drawings are included to provide further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Reference will now be made in detail to present preferred embodiments of the disclosure, examples of which are illustrated in the accompanying drawings. Wherever possible, the same reference numbers are prepared in the drawings and the description to refer to the same or like parts.

Figure 1:
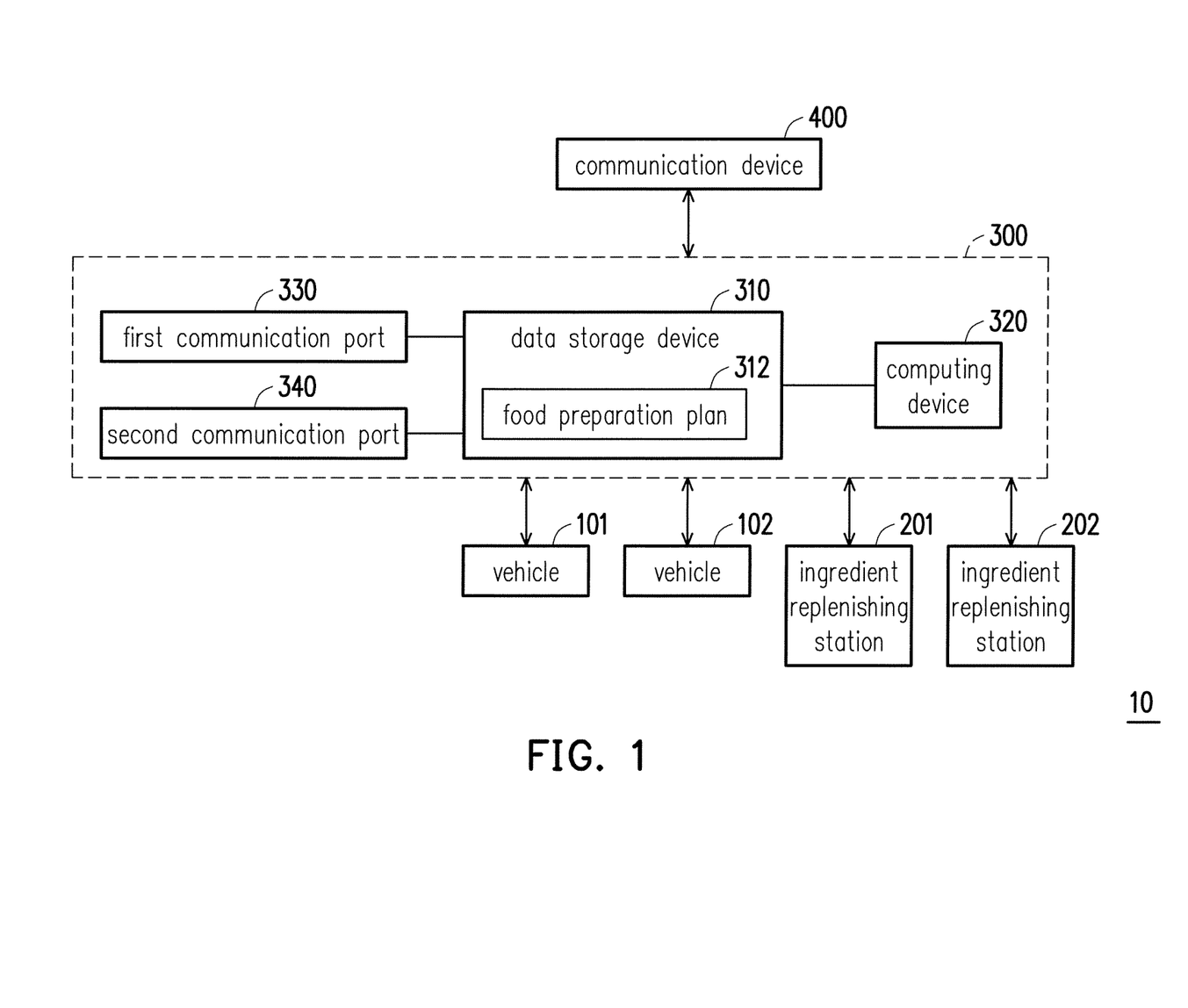
FIG. 1 illustrates a block diagram of a mobile cooking and ingredient supply system according to an embodiment of the disclosure.
Figure 2:
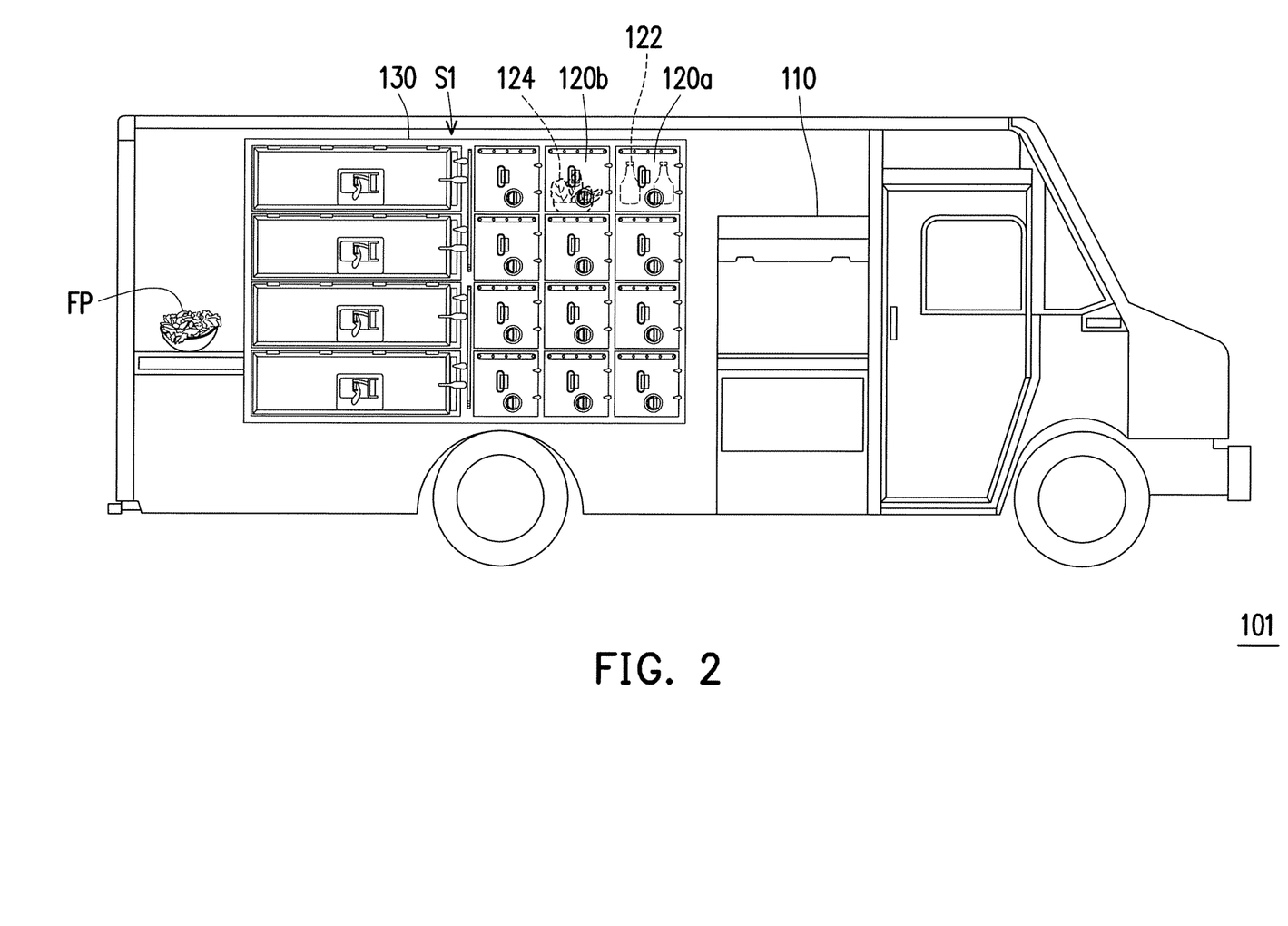
FIG. 2 illustrates a schematic view of a vehicle of a mobile cooking and ingredient supply system according to an embodiment of the disclosure.
Figure 3A:
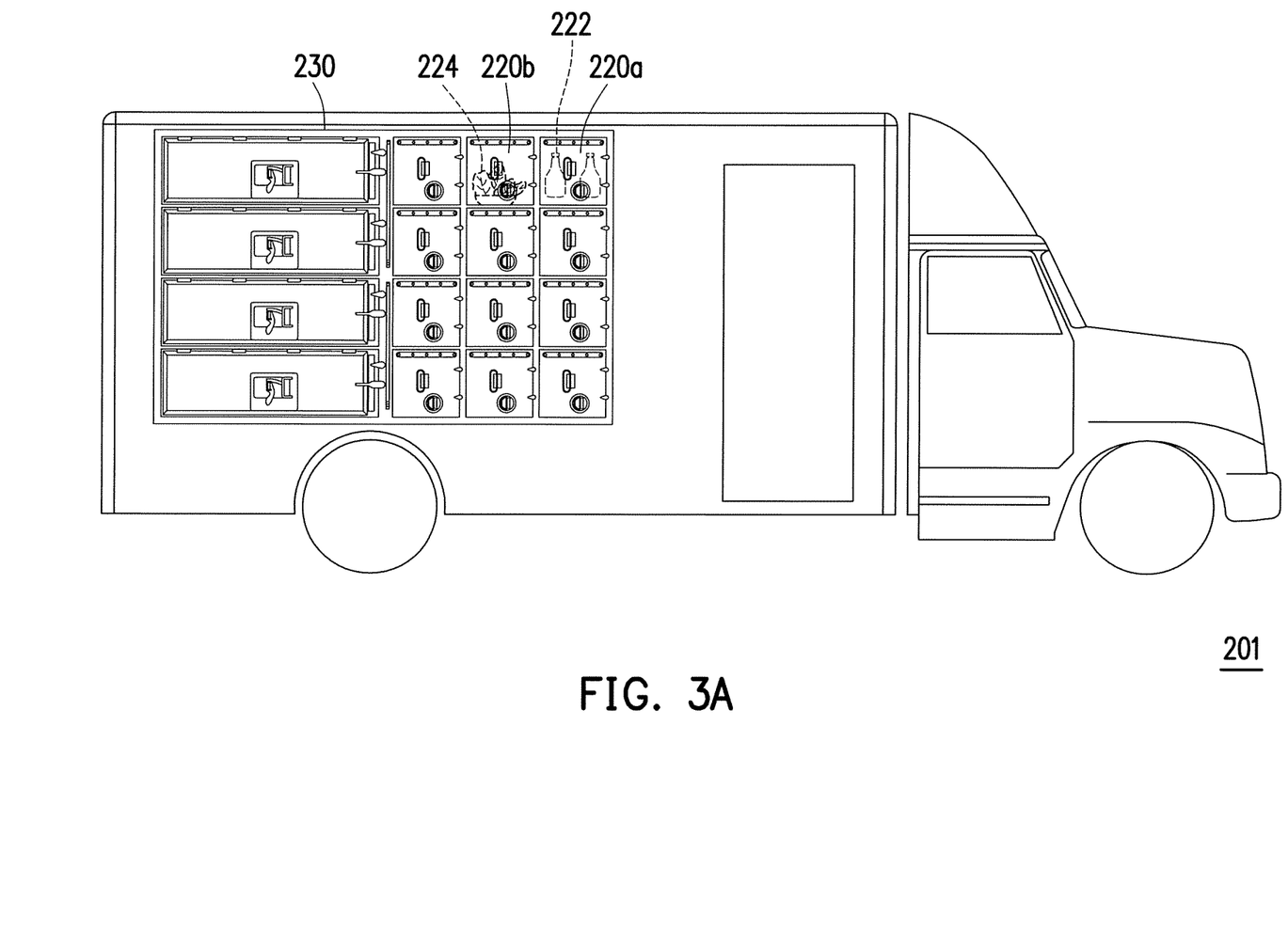
FIG. 3A illustrates a schematic view of a mobile ingredient replenishing station of a mobile cooking and ingredient supply system according to an embodiment of the disclosure.
Figure 3B:
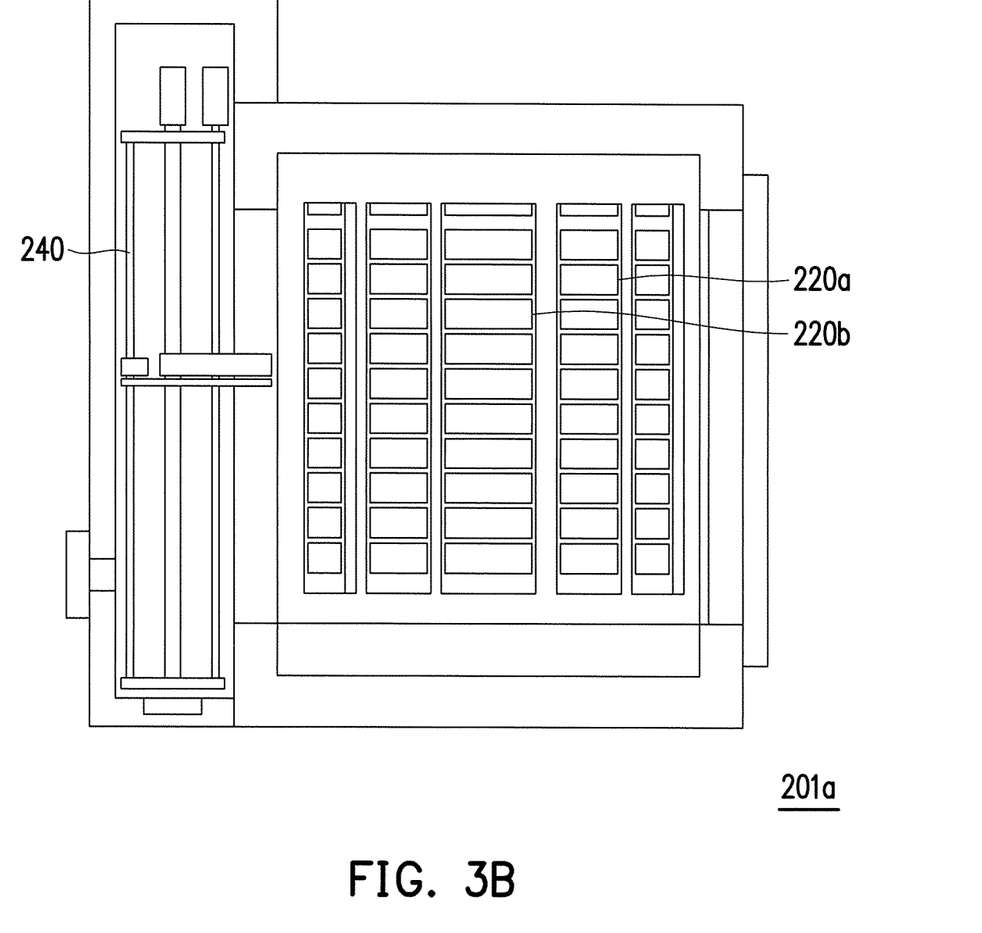
FIG. 3B illustrates a stationary replenishing station, which is placed in a predetermined location, of a mobile cooking and ingredient supply system according to an embodiment of the disclosure.

FIG. 1 illustrates a block diagram of a mobile cooking and ingredient supply system according to an embodiment of the disclosure. FIG. 2 illustrates a schematic view of a vehicle of a mobile cooking and ingredient supply system according to an embodiment of the disclosure. FIG. 3A illustrates a schematic view of a mobile ingredient replenishing station of a mobile cooking and ingredient supply system according to an embodiment of the disclosure. FIG. 3B illustrates a stationary replenishing station, which is placed in a predetermined location, of a mobile cooking and ingredient supply system according to an embodiment of the disclosure. Referring to FIG. 1 to FIG. 3B, in some embodiments, a mobile cooking and ingredient supply system 10 is configured to accept (remote) instructions regarding food preparation plan, as well as for preparing food products, travel to food preparation locations to serve the food products, preparing ingredient supply modules, travel to ingredient replenishing station to replenish ingredient supply modules for preparing the food products, etc. The mobile cooking and ingredient supply system 10 may be a system to prepare food and supply ingredients. In some embodiments, the mobile cooking and ingredient supply system 10 may include at least one vehicle (multiple vehicles 101, 102 are illustrated but not limited thereto), at least one data storage device 310, at least one cooking module 110, at least one ingredient supply rack 130, a plurality of first ingredient supply modules 120a, 120b, at least one ingredient replenishing station (multiple ingredient replenishing stations 201, 202 are illustrated but not limited thereto), and at least one computing device 320.

In the present embodiment, the mobile cooking and ingredient supply system 10 includes a plurality of vehicles 101, 102 and a plurality of ingredient replenishing station 201, 202. It is noted that the numbers of the vehicles 101, 102 and ingredient replenishing stations 201, 202 are merely for illustration. The disclosure does not limit the numbers of the vehicles and ingredient replenishing stations. Components and devices disposed in each of the vehicles 101, 102 may be substantially the same or at least similar. Herein, FIG. 2 and the descriptions merely describe the components and the devices disposed in the vehicle 101 for the sake of brevity and clarity, but it should be understood that substantially the same or at least similar components and devices are also applied to the vehicle 102 and any other vehicles of the mobile cooking and ingredient supply system 10.

Figure 4A:
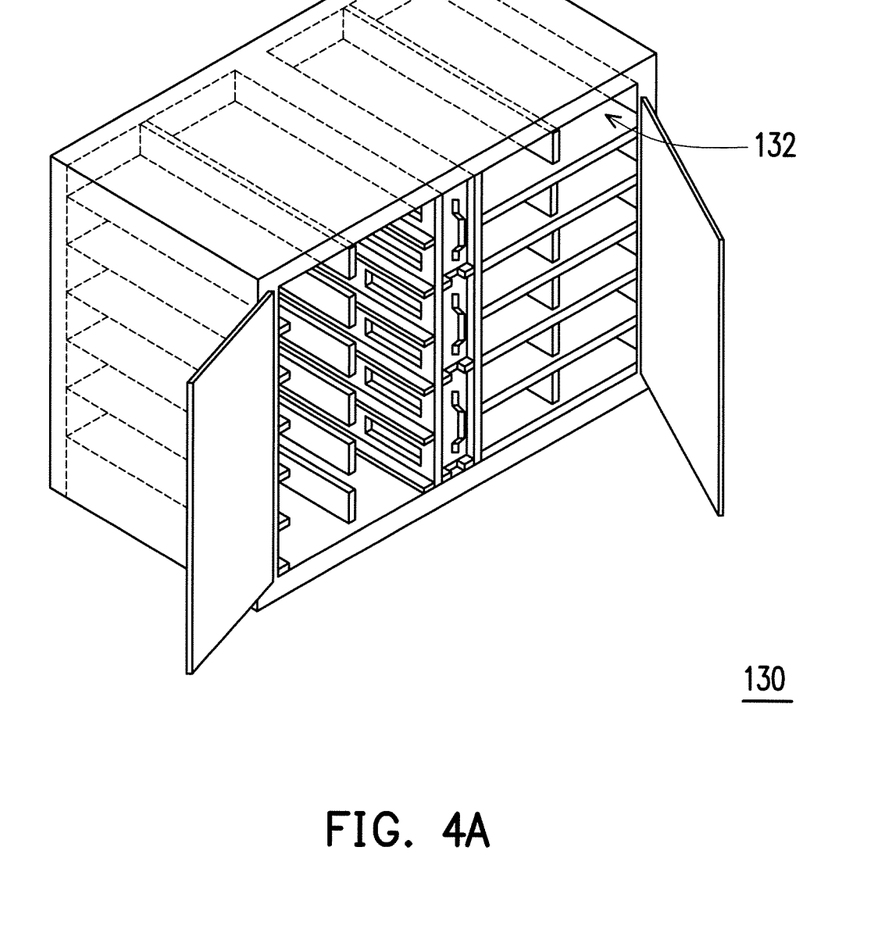
FIG. 4A illustrates a schematic view of an ingredient supply rack of a mobile cooking and ingredient supply system according to an embodiment of the disclosure.

Referring to FIG. 2, in the present embodiment, the vehicle 101 has a cargo space S1. The ingredient supply rack 130 as shown in FIG. 2 and FIG. 4 is securely disposed in the cargo space S1. A plurality of first ingredient supply modules 120a, 120b are carried by the ingredient supply rack 130 and engaged with the ingredient supply rack 130. It is noted that the numbers of the first ingredient supply modules in FIG. 2 are merely for illustration. The disclosure does not limit the numbers of the first ingredient supply modules. Each of the first ingredient supply modules 120a/120b includes a plurality of ingredients 122/124 for preparing at least one food product FP. A cooking module 110 is also disposed in the cargo space Si to prepare the food product FP. For example, the food product FP may be a salad bowl with available selections of a variety of greens, salad dressings, types of protein, etc. Accordingly, the ingredients 122 in the first ingredient supply module 120a may be, for example, tomatoes, and the ingredients 124 in the first ingredient supply module 120b may be, for example, cheeses. However, the disclosure does not limit numbers and types of the ingredients in each of the first ingredient supply modules 120a, 120b.

FIG. 3A and the descriptions describe the components and the devices disposed in the mobile ingredient replenishing station 201. It should be understood that substantially the same or at least similar components and devices may also be applied to the ingredient replenishing station 201a placed in a predetermined location illustrated in FIG. 3B, as well as to any other ingredient replenishing stations of the mobile cooking and ingredient supply system 10. In the present embodiment, the ingredient replenishing station 201 carries a plurality of second ingredient supply modules 220a, 220b. In some embodiments, the ingredient replenishing station 201a may further include an elevator unit 230 as shown in FIG. 3B to pick up and move the second ingredient supply modules 220a, 220b to a predetermined location. In some embodiments, each of the second ingredient supply modules 220a/220b includes a plurality of ingredients 222/224 for preparing the food product FP. In some embodiments, the ingredients 222, 224 in the second ingredient supply modules 220a, 220b may be respectively corresponding to the ingredients 122, 124 in the first ingredient supply modules 120a, 120b, but the disclosure is not limited thereto.

Figure 4B:
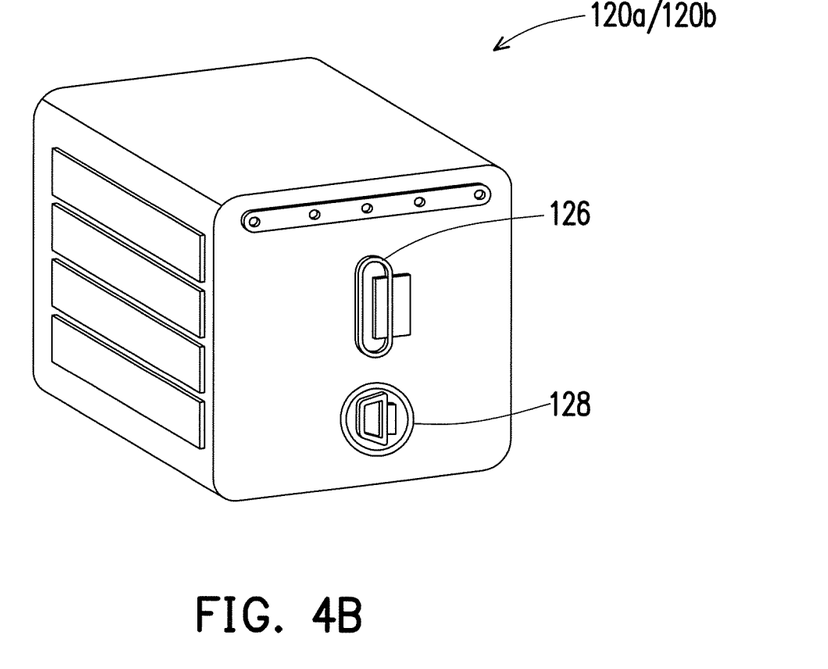
FIG. 4B illustrates a schematic view of an ingredient supply module of a mobile cooking and ingredient supply system according to an embodiment of the disclosure.

FIG. 4A illustrates a schematic view of an ingredient supply rack of a mobile cooking and ingredient supply system according to an embodiment of the disclosure. FIG. 4B illustrates a schematic view of an ingredient supply module of a mobile cooking and ingredient supply system according to an embodiment of the disclosure. It is noted that FIG. 4A and FIG. 4B depict one of the formations of the ingredient supply rack 130 and the first ingredient supply modules 120a, 120b disposed in the vehicles 101, 102 for illustration purpose, but the disclosure is not limited thereto. Moreover, it should be apparent to those skilled in the art that the ingredient supply rack 230 and the second ingredient supply modules 220a, 220b with structure substantially the same as or at least similar to the ingredient supply rack 130 and the first ingredient supply modules 120a, 120b shown in FIG. 4A and FIG. 4B may also be disposed in the ingredient replenishing stations 201, 202. In particular, at least the physical dimensions of the second ingredient supply modules 220a, 220b can be substantially the same as the physical dimensions of the first ingredient supply modules 120a, 120b, so as to facilitate exchanging. As seen in FIG. 4A, the ingredient supply rack 130 may include a plurality of slots 132 for carrying the first ingredient supply modules 120a, 120b, and the dimensions of the slots 132 may be the same, and may be partially different. As seen in FIG. 4B, the first ingredient supply module 120a/120b may have a handle 126, such that the first ingredient supply module 120a/120b can be picked up via the handle 126 after the first ingredient supply module 120a/120b is taken out from the slots 132 of the ingredient supply rack 130. In some embodiments, the first ingredient supply module 120a/120b may also have a temperature adjusting switch 128 to perform heating or cooling to the ingredients 122/124 stored therein.

In the present embodiment, the mobile cooking and ingredient supply system 10 may include a server 300. The server may be a remote server configured to communicate with the vehicles 101, 102 and the ingredient replenishing stations 201, 202 through wire (e.g., ethernet) or wireless communication (e.g., 4G or WiFi). In some embodiments, the server 300 includes a data storage device 310 and a computing device 320. In some embodiments, the data storage device 310 is configured to store a food preparation plan 312. The food product FP is prepared based at least in part on the food preparation plan 312. In some embodiments, the food preparation plan 312 may be a dynamically updated food preparation plan, which may be associated at least in part with information of at least one food preparation location, at least one preparation time, and at least one ingredient for preparing a food product FP. In some embodiments, the data storage device 310 may be a non-transitory computer-readable medium storing a plurality of computer-executable instructions, and the computing device 320 is communicatively coupled to the non-transitory computer-readable medium to execute the computer-executable instructions. In some embodiments, the computing device 320 is configured with the computer-executable instructions based at least in part on the food preparation plan 312.

With the arrangement, if one of the ingredients 122/124 (e.g. ingredients 122) is running low in the vehicle 101, the ingredient replenishing station 201 may be notified and prepare the second ingredient supply module 220a and/or 220b to meet with the vehicle 101 for replenishing at least one of the first ingredient supply modules 120a and/or 120b in the vehicle 101. Similarly, the mobile ingredient replenishing station 202 may also be notified and configured to meet with the vehicle 102 for replenishing at least one of the first ingredient supply modules 120a and/or 120b in the vehicle 102. For the sake of brevity and clarity, the following descriptions are addressed to one of the embodiments, which is the ingredient replenishing station 201 configured to meet with the vehicle 101 for replenishing the first ingredient supply module 120a in the vehicle 101, but the disclosure is not limited thereto. It should be understood that the following descriptions addressed to the ingredient replenishing station 201, the second ingredient supply module 220a, the vehicle 101 and the first ingredient supply module 120a may also be applied to the ingredient replenishing stations 202, the second ingredient supply module 220b, the vehicle 102 and the first ingredient supply module 120b.

In the present embodiment, the computer device 320 automatically causes the ingredient replenishing station 201 to prepare the second ingredient supply module 220a based at least in part on the food preparation plan 312, and automatically selects meeting time and meeting location based at least in part on the food preparation plan 312 for the vehicle 101 to meet with the ingredient replenishing station 201 to replenish the first ingredient supply module 120a in the vehicle 101. In one of the implementations of the present embodiment, the method of replenishing the first ingredient supply module 120a includes, for example, exchanging the first ingredient supply module 120a for the second ingredient supply module 220a in the ingredient replenishing station 201. In some embodiments, a physical dimension of the first ingredient supply module 120a is the same as a physical dimension of the second ingredient supply module 220a, so the second ingredient supply module 220a can also be held by the ingredient supply rack 130 (for example, the ingredient supply rack 130 shown in FIG. 4) of the vehicle 101 after the exchange. In some embodiments, the ingredient replenishing station 201 may be placed in various locations. Namely, the ingredient replenishing station 201 may be a vehicle and capable of traveling to various locations. Alternatively, in other embodiments, the ingredient replenishing station (such as the replenishing station 202 illustrated in FIG. 3B) may be a stationary station and can be placed in a predetermined location.

Figure 5:
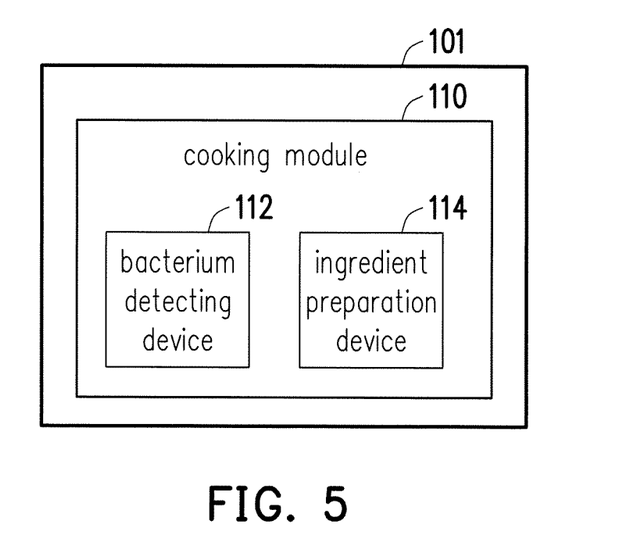
FIG. 5 illustrates a schematic view of a route for a vehicle of a mobile cooking and ingredient supply system according to an embodiment of the disclosure.

FIG. 5 illustrates a schematic view of a route for a vehicle of a mobile cooking and ingredient supply system according to an embodiment of the disclosure. In some embodiments, the vehicle 101 may be planned to visit a plurality of food preparation locations L1, L2, L3 to provide a plurality of food products FP. The food products FP provided at the food preparation locations L1, L2, L3 may be the same or may be different. Accordingly, for the second ingredient supply module 220a carried by the ingredient replenishing station 201, the computing device 320 may dynamically determine a type and a quantity of one of the ingredients 222/224 (e.g. ingredients 222) to be prepared based at least in part on the food preparation plan 312, which is the plan for the vehicle 101 to visit at least one of the food preparation locations L1, L2, L3. For the vehicle 101, the computing device 320 may dynamically determine an estimated travel time and an estimated stop time for the vehicle 101 to visit one of the food preparation locations L1, L2, L3 along a route R1 which starts or ends with meeting the ingredient replenishing stations 201. The estimated travel time for the vehicle 101 to the food preparation locations L1, L2, L3 may be dynamically determined based at least in part on updated traffic information of the route R1. In some embodiments, for the vehicle 101, the computing device 320 may dynamically determine the ingredients 122 carried by the first ingredient supply modules 120a to be prepared and the food products FP to be prepared based at least in part on the food preparation plan 312 when traveling along the route RI.

For example, the vehicle 101 may be planned to visit the food preparation locations L1, L2, L3 based at least in part on the food preparation plan 312 to serve the food products FP, and the computing device 320 may dynamically determine the ingredients 122 carried by the first ingredient supply modules 120a to be prepared and the food products FP to be prepared based at least in part on the food preparation plan 312 when traveling along the route R1. In some embodiments such as the ingredients 122 in the vehicle 101 running low, the computing device 320 may dynamically determine the type and the quantity of the ingredients 222 for the second ingredient supply module 220a to be prepared based at least in part on the food preparation plan 312. Also, the computing device 320 may dynamically determine the estimated travel time and the estimated stop time for the vehicle 101 to visit each of the food preparation locations L1, L2, L3 along the route R1, and the route R1 starts or ends with meeting the ingredient replenishing station 201 to replenish the first ingredient supply module 120a. In some embodiments, the computing device 320 may automatically select the meeting time for the vehicle 101 to meet with the ingredient replenishing station 201 based on a transit time to the food preparation locations L1, L2, L3 and the preparation time spent in the food preparation location L1, L2, L3. In some embodiments, the computing device 320 may automatically select the meeting location for the vehicle 101 to meet with the ingredient replenishing station 201 based on a location of the ingredient replenishing station 201 and a distance between the location of the ingredient replenishing station 201 and the food preparation location L1, L2, L3 (e.g. the closest one of the food preparation location L1, L2, L3).

In some embodiments, the mobile cooking and ingredient supply system 10 may further include a first communications port 330 and a second communications port 340. The first communications port 330 is communicatively coupled to the data storage device 310 to provide information indicative of a location of the ingredient replenishing station 201 and the quantity of the ingredient 222 in the second ingredient supply module 220a carried by the ingredient replenishing station 201. The second communications port 340 is communicatively coupled to the data storage device 310 to provide information indicative of a location of the vehicle 101 and the quantity of the ingredients 122 of the first ingredient supply module 120a carried by the vehicle 101. Accordingly, the computing device 320 may determine the route R1 to serve the food products at the food preparation locations L1, L2, L3 and to replenish the first ingredient supply module 120a.

In some embodiments, referring to FIG. 1, the computing device 320 is in remote communication with a communication device 400 to dynamically share or update at least in part of the food preparation plan 312 based at least in part on the food preparation locations L1, L2, L3, the preparation time and the food products FP to be prepared. In some embodiment, the computing device 320 dynamically determine the time and the location for the vehicle 101 to meet with the ingredient replenishing station 201 to replenish the first ingredient supply module 120a based at least in part on updated usage information of the ingredient 122 and based at least in part on the dynamically updated food preparation plan 312.

In some embodiments, for the vehicle 101, the computing device 320 may dynamically determine a variance in the route R1 of the vehicle 101 and dynamically determine the change of at least one of the food preparation locations L1, L2, L3 to be visited along the route R1 based at least in part on the variance of the route R1. The variance in the route R1 may be dynamically determined based at least in part on the dated traffic information of the route R1. In some embodiments, the computing device 320 may dynamically determine a replacement of the vehicle 101 based at least in part on the variance of the route R1. For example, the computing device 320 may dynamically determine to replace the vehicle 101 with the vehicle 102 due to the variance of the route R1.

Figure 6:
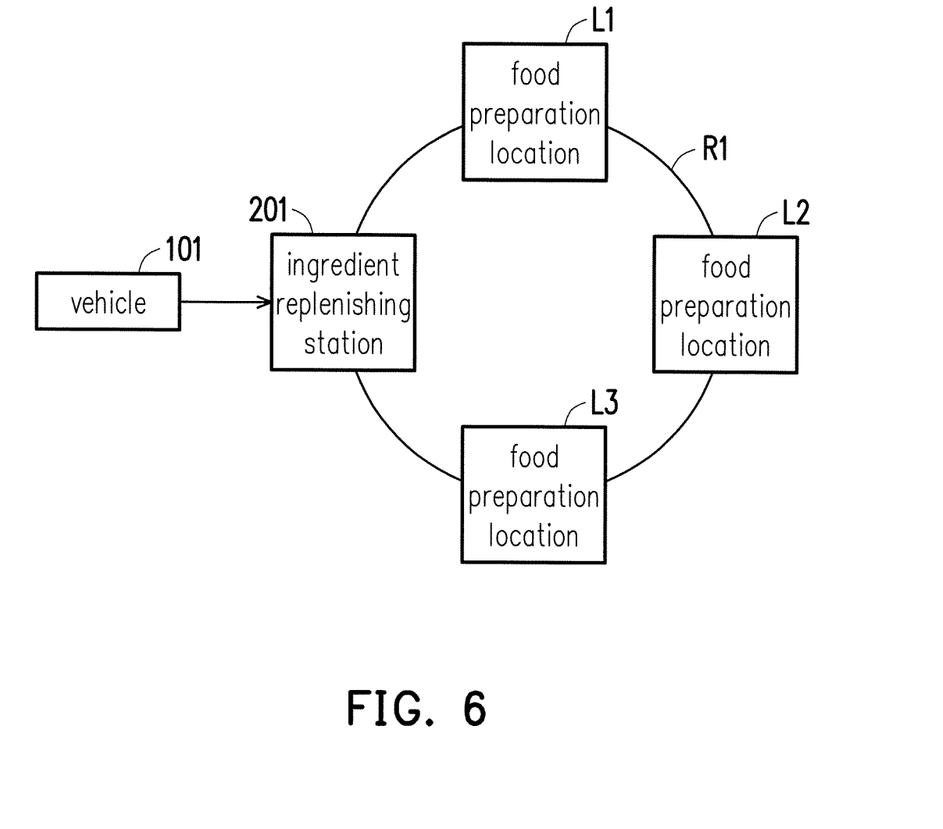
FIG. 6 illustrates a block diagram of a vehicle of a mobile cooking and ingredient supply system according to an embodiment of the disclosure.

FIG. 6 illustrates a block diagram of a vehicle of a mobile cooking and ingredient supply system according to an embodiment of the disclosure. Referring to FIG. 5 and FIG. 6, in some embodiments, the cooking module 110 may include an ingredient preparation device 114 configured to mechanically obtain measurable portions of the ingredients 122, 124 from the first ingredient supply modules 120a, 120b and to prepare the ingredients 122, 124. In some embodiments, the preparation of the ingredients 122, 124 by the ingredient preparation device 114 may include mixing the ingredients 122, 124 in at least one controllable manner or to shaping the ingredients 122, 124 into at least one controllable shape. For example, the greens may be chopped into eatable pieces, and the chopped greens and the dressing may be mixed in respective proportions. Certainly, the disclosure does not limit ways, orders of preparing the ingredients 122, 124. In some embodiments, the ingredient preparation device 114 is in communication with the computing device 320 and is configured to receive a request, which may be remotely made by a customer, and automatically prepare the ingredients 122, 124 for the cooking module 110 based at least in part on the request. In some embodiments, the computing device 320 is further configured to identify an ingredient 122/124 in the first ingredient supply modules 120a/120b and to obtain ingredient data corresponding to the ingredient 122/124. The ingredient data may include an ingredient description or available quantity of the ingredient 122/124 from an ingredient data source for updating the food preparation plan 312 dynamically with the ingredient data.

In some embodiments, the cooking module 110 may further include a bacterium detecting device 112 configured to detect existence of a type of bacteria when preparing the food product FP. The computing device 320 is further configured to obtain a detecting result in real time from the bacterium detecting device 112 and to dynamically update the food preparation plan 312 with the detecting result from the bacterium detecting device 112. In some embodiment, for the vehicle 101, the computing device 320 may dynamically determine a cancellation from at least one of the food preparation locations L1, L2, L3 along the route R1 based at least in part on existence of at least one type of bacteria detected by the bacterium detecting device 112.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A mobile cooking and ingredient supply system, comprising:
   a vehicle having a cargo space;
   a data storage device storing a food preparation plan, and the food preparation plan associated at least in part with information of at least one food preparation location, at least one preparation time, and at least one ingredient for preparing a food product;
   a cooking module configured to prepare the food product based at least in part on the food preparation plan, wherein the cooking module comprises an ingredient preparation device configured to mechanically obtain measurable portions of a plurality of ingredients from a plurality of first ingredient supply modules and to prepare the ingredients comprising mixing the ingredients in at least one controllable manner or to shaping the ingredients into at least one controllable shape;
   an ingredient supply rack securely disposed in the cargo space;
   the plurality of first ingredient supply modules carried by the ingredient supply rack; and
   an ingredient replenishing station carrying a plurality of second ingredient supply modules and configured to meet with the vehicle and to replenish one of the first ingredient supply modules in the vehicle; and
   a computing device configured with specific computer-executable instructions based at least in part on the food preparation plan, automatically causes the ingredient replenishing station to prepare one of the second ingredient supply modules based at least in part on the food preparation plan, and automatically selects meeting time and meeting location based at least in part on the food preparation plan, for the vehicle to meet with the ingredient replenishing station to replenish one of the first ingredient supply modules in the vehicle.

2. The mobile cooking and ingredient supply system of claim 1, wherein the ingredient replenishing station is placed in a predetermined location.

3. The mobile cooking and ingredient supply system of claim 1, wherein the ingredient replenishing station is a mobile station and placed in a variable location.

4. The mobile cooking and ingredient supply system of claim 1, wherein the method of replenishing the one of the first ingredient supply modules in the vehicle comprises exchanging the one of the first ingredient supply modules for the one of the second ingredient supply modules in the ingredient replenishing station.

5. The mobile cooking and ingredient supply system of claim 4, wherein a physical dimension of the first ingredient supply module to be exchanged is the same as a physical dimension of the second ingredient supply module to be exchanged.

6. The mobile cooking and ingredient supply system of claim 1, wherein the computing device automatically selects the meeting time for the vehicle to meet with the ingredient replenishing station based on a transit time to the food preparation location and the preparation time spent in the food preparation location.

7. The mobile cooking and ingredient supply system of claim 1, wherein the computing device automatically selects the location for the vehicle to meet with the ingredient replenishing station based on a location of the ingredient replenishing station and a distance between the location of the ingredient replenishing station and the food preparation location.

8. The mobile cooking and ingredient supply system of claim 1, wherein the computing device is further configured to identify an ingredient in the first ingredient supply modules and to obtain ingredient data comprising an ingredient description or available quantity of the ingredient from an ingredient data source for updating the food preparation plan dynamically with the ingredient data.

9. The mobile cooking and ingredient supply system of claim 1, wherein the cooking module comprises a bacterium detecting device configured to detect existence of a type of bacteria when preparing the food product.

10. The mobile cooking and ingredient supply system of claim 9, wherein the computing device is further configured to obtain a detecting result in real time from the bacterium detecting device and to dynamically update the food preparation plan with the detecting result from the bacterium detecting device.

11. The mobile cooking and ingredient supply system of claim 1, wherein the ingredient preparation device is in communication with the computing device and is configured to receive a request and automatically prepare the ingredients for the cooking module based at least in part on the request.

12. The mobile cooking and ingredient supply system of claim 1, wherein the computing device is in remote communication with a communication device to dynamically share or update at least in part of the food preparation plan based at least in part on the food preparation location, the preparation time and the food product to be prepared.

13. The mobile cooking and ingredient supply system of claim 1, wherein the vehicle comprises a plurality of vehicles, and the ingredient replenishing station comprises a plurality of ingredient replenishing stations, and the system further comprises:
 a non-transitory computer-readable medium storing a plurality of computer- executable instructions, wherein the computing device is communicatively coupled to the non-transitory computer-readable medium to execute the computer-executable instructions to:
 for one of the plurality of vehicles and one of the plurality of ingredient replenishing stations, determine time and location based at least in part on a dynamically updated food preparation plan, for the one of the vehicles to meet with the one of the ingredient replenishing stations to replenish one of the plurality of first ingredient supply modules in the one of the vehicles by exchanging the one of the first ingredient supply modules for one of a plurality of second ingredient supply modules from the one of the ingredient replenishing stations;
 for one of the second ingredient supply modules carried by the one of the ingredient replenishing stations, determine a type and a quantity of one of a plurality of ingredients to be prepared based at least in part on the dynamically updated food preparation plan for one of the vehicles to visit one of a plurality of food preparation locations to prepare the food product;
 for the one of the vehicles, determine an estimated travel time and an estimated stop time for the one of the vehicles to visit the one of the food preparation locations along a route which starts and ends with meeting at least one of the ingredient replenishing stations, and
 for the one of the vehicles, determine one of a plurality of ingredients carried by the one of the first ingredient supply modules to be prepared and at least one food product to be prepared based at least in part on the dynamically updated food preparation plan when traveling along the route;
 a first communication port communicatively coupled to the non-transitory computer-readable medium to provide information indicative of a location of the one of the ingredient replenishing stations and the quantity of the one of the ingredients in the one of the second ingredient supply modules carried by the one of the ingredient replenishing stations; and
 a second communication port communicatively coupled to the non-transitory computer-readable medium to provide information indicative of a location of the one of the vehicles and a quantity of the one of the ingredients of the one of the first ingredient supply modules carried by the one of the vehicles.

14. The system of claim 13, wherein the computing device dynamically determine the type and the quantity of the one of the ingredients to be prepared for the one of the second ingredient supply modules, and the type and the quantity of the one of the ingredients are determined based at least in part on the dynamically updated food preparation plan for the one of the vehicles to visit the one of the food preparation locations.

15. The system of claim 13, wherein the computing device dynamically determine the time and the location for the one of the vehicles to meet with the one of the ingredient replenishing stations to replenish the at least one first ingredient supply module based at least in part on updated usage information of the at least one ingredient and based at least in part on the dynamically updated food preparation plan.

16. The system of claim 13, wherein the computing device dynamically determine the estimated travel time for the one of the vehicles to the one of the food preparation locations based at least in part on updated traffic information of the route.

17. The system of claim 13, wherein, for one of the vehicles, the computing device dynamically determines a variance in the route of each of the vehicles, and dynamically determines the change of one of the food preparation locations to be visited along the route based at least in part on the variance of the route.

18. The system of claim 17, wherein, for one of the vehicles, the computing device dynamically determines whether one of the vehicles should be replaced or not based at least in part on the variance of the route.

19. The system of claim 13, wherein, for one of the vehicles, the computing device dynamically determines a cancellation from one of the food preparation locations to be visited along the route based at least in part on existence of at least one type of bacteria detected by a bacterium detecting device.

* * * * *